Sept. 26, 1967   A. W. BLANSHINE ETAL   3,343,276
CROP DRYING SHED

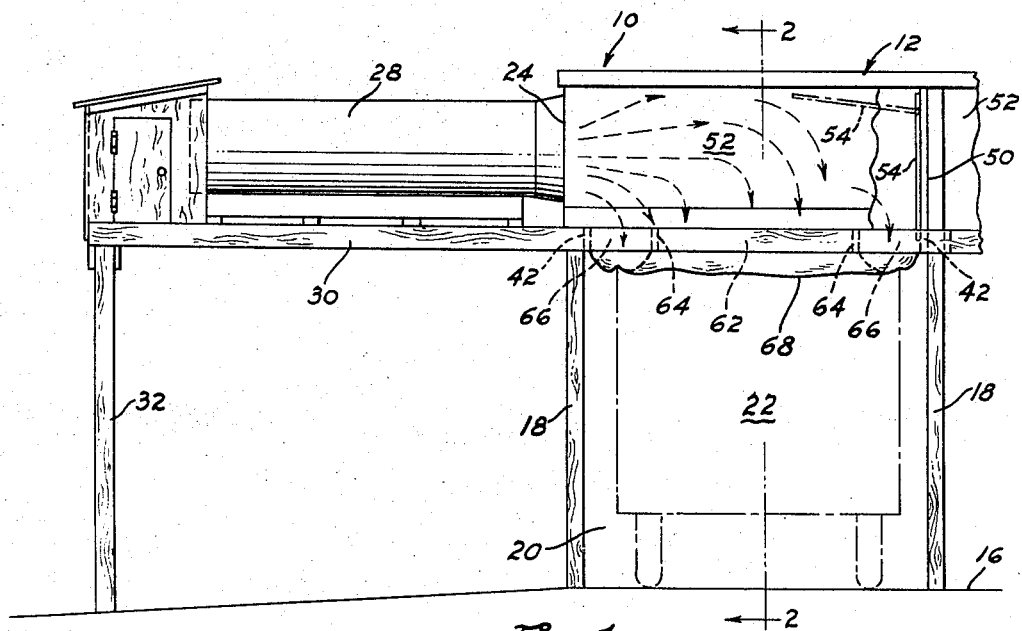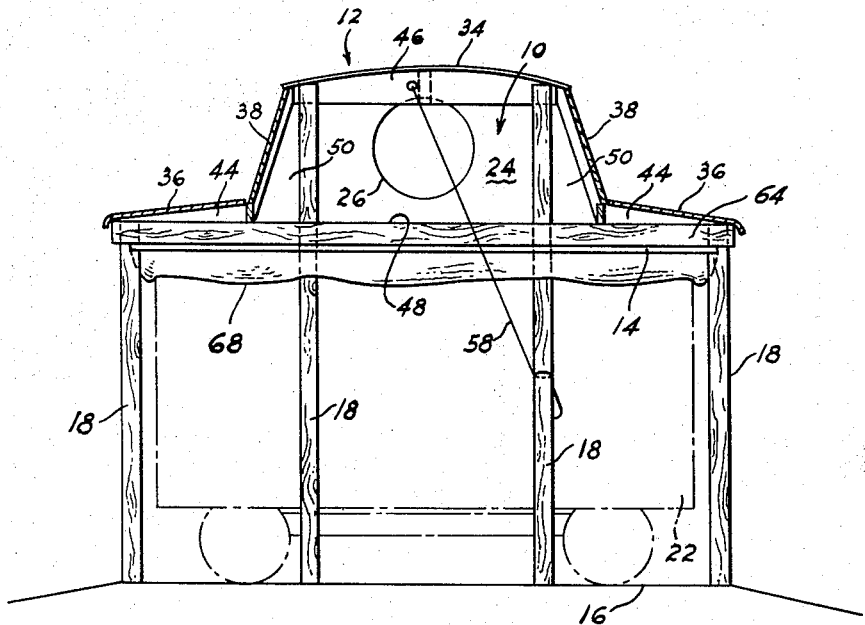

Filed Oct. 1, 1965   3 Sheets-Sheet 2

INVENTORS
ALLISON W. BLANSHINE
WILLIAM W. MANN

ATTORNEY

Sept. 26, 1967  A. W. BLANSHINE ETAL  3,343,276
CROP DRYING SHED

Filed Oct. 1, 1965  3 Sheets-Sheet 3

INVENTORS
ALLISON W. BLANSHINE
WILLIAM W. MANN

ATTORNEY

United States Patent Office 3,343,276
Patented Sept. 26, 1967

3,343,276
CROP DRYING SHED
Allison W. Blanshine, Lititz, and William W. Mann, Talmage, Pa., assignors to Sperry Rand Corporation, New Holland, Pa., a corporation of Delaware
Filed Oct. 1, 1965, Ser. No. 492,044
5 Claims. (Cl. 34—216)

This invention pertains to a crop drying shed and, more particularly, to a relatively inexpensive shed arranged to generate and discharge drying air from an overhead plenum chamber into vehicles, such as wagons, containing agricultural crops to be dried when moved into position beneath said plenum chamber. By way of example of crops to be dried reference is made to forage crops, such as baled hay and the like, in particular, but without restriction thereto. Grain and the like may be dried equally well by the structure comprising the present invention.

Various types of devices have been devised heretofore in attempts to produce different means for drying agricultural crops of the type referred to. Many of these, including the proposed use of flexible bags or shrouds enclosing vehicles containing such crops have been cumbersome to handle incident to installing the same in use with respect to such vehicles and are subject to damage. Certain, quite sophisticated and relatively expensive types of stationary structures also have been developed heretofore, one such structure being disclosed in U.S. Patent No. 3,159,468.

It is the principal purpose of the present invention to provide a relatively inexpensive and simple crop drying shed, preferably constructed from wooden beams, plywood, and the like, and so constructed as to provide an overhead plenum chamber preferably comprising a longitudinally extending conduit-like central portion which is divided by partitions into compartments respectively disposed over a series of transversely extending bays beneath said plenum chamber which individually receive loads of product material to be dried, the ceiling portion over each bay having discharge openings therein which are permanently open, and a heater at one end of the plenum chamber generates and discharges heated air into the chamber for delivery through said discharge openings into the loads to be dried. Very simple discharge control means are provided in the form of relatively large passage openings formed in the partitions defining said compartments and through which heated air passes from one compartment to another, a simple and readily operated door closing said openings between said compartments when it is desired to restrict the discharge of air through the ceiling openings to only a limited number of bays commencing with the one nearest the heater and continuing in succession therefrom until all of the bays may be arranged to have heated air discharged thereinto if each of the bays contains a load to be dried.

Another object of the invention is to provide simple but highly effective sealing means which are flexible and capable of being inflated into sealing engagement with the perimeter of the upper edge of vehicles containing loads of material to be dried when moved beneath the discharge openings in the ceilings above each bay, such sealing being accomplished automatically without manipulation, simply by moving the vehicle into a predetermined position beneath the discharge opening in the ceiling above each bay.

A still further object of the invention is to provide very simple means to support closure doors for the openings in the partitions defining the compartments of the plenum chamber, said support means comprising simply hinged mechanism at the upper edges of the door, whereby the door may be opened by pivoting the lower edges thereof upwardly into the plenum chamber and flexible means, such as light cables or simple rope arrangements, extending through appropriate guide means and then into the bays beneath the plenum chamber are capable of very effectively moving the doors between open and closed positions.

Details of the foregoing objects and of the invention, as well as other objects thereof, are set forth in the following specification and illustrated in the drawngs comprising a part thereof.

In the drawings:

FIG. 1 is a fragmentary side elevation of one end of a crop drying shed embodying the principles of the invention.

FIG. 2 is a vertical sectional view of the crop drying shed illustrated in FIG. 1 as seen on the line 2—2 of FIG. 1.

Figure 4:
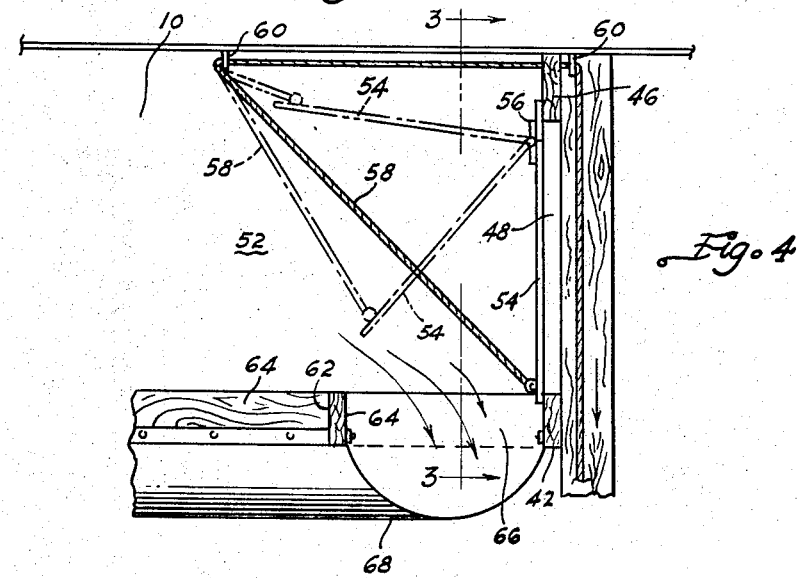

FIG. 4 is a fragmentary longitudinal vertical sectional view of the plenum chamber in the upper portion of the drying shed illustrated in FIGS. 1 and 2 and showing details of sealing means engageable with loaded vehicles to minimize the leakage of drying air during delivery thereof to the loaded vehicle, and also illustrating certain details of closure doors between compartments of the plenum chamber.

Figure 5:
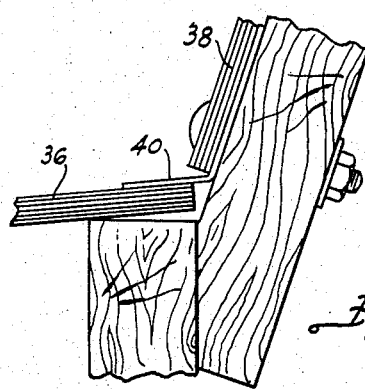

FIG. 5 is a fragmentary vertical elevation of a detail of part of the roof structure of the crop drying shed illustrated in FIGS. 1 and 2.

Figure 6:
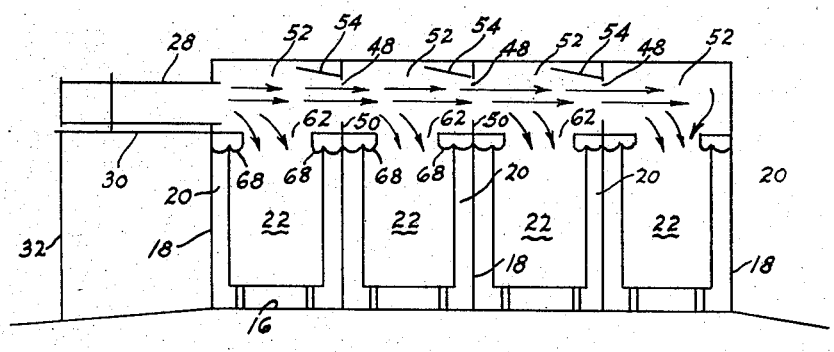

FIG. 6 is a diagrammatic, longitudinal sectional view of a complete shed embodying the principles of the invention and illustrating the manner in which heated air is discharged into all bays of the drying shed in accordance with the principles of the invention.

Figure 7:
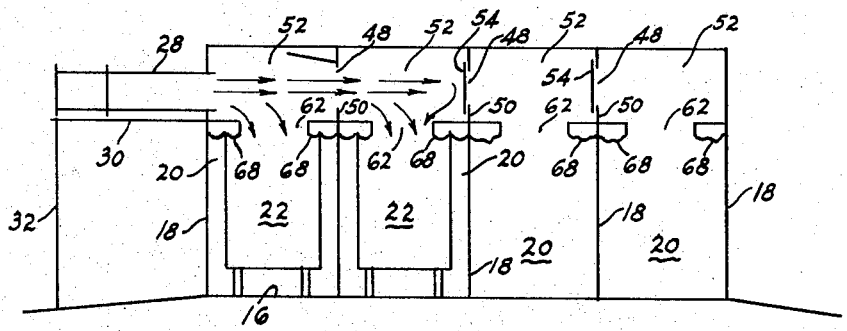

FIG. 7 is a view similar to FIG. 6, but illustrating an arrangement for the discharge of heated air into only a limited number of bays and showing the manner in which exclusion of the delivery of heated air is effected relative to the compartments over those bays which have no vehicles therein.

Referring particularly to FIGS. 1 and 2, it will be seen that the crop drying shed illustrated therein preferably comprises an overhead plenum chamber 10 which extends longitudinally of the shed between the opposite ends thereof and preferably centrally thereof, said plenum chamber primarily being defined by a roof structure 12 and a ceiling structure 14. The ceiling structure 14 preferably is of simple nature and may be formed from plywood or the like, or of any other appropriate impervious, stiff sheet material such as sheet metal. Ceiling structure 14 extends between the opposite longitudinal side edges of the shed, as seen in FIG. 2, and between the opposite ends of the shed.

The plenum chamber 10, and especially the roof structure 12 and ceiling structure 14 defining the same, is supported in vertically spaced relationship a uniform distance above the ground 16 by a plurality of vertical posts or standards 18 which may comprise wooden planks of suitable size. As viewed in FIG. 1, as well as in FIGS. 6 and 7, it will be seen that the posts 18 are spaced apart in a longitudinal direction with respect to the shed so as to define bays 20 therebetween. Said bays, as viewed in FIGS. 1, 6 and 7, are of adequate width to receive a vehicle such as a wagon 22 which is shown in phantom in FIGS. 1 and 2 and in full lines in FIGS. 6 and 7 in certain of said bays.

The elevation of the ceiling structure 14 above the ground 16 is slightly greater than the over all height of the vehicles 22 which are loaded with agricultural products, such as forage crops, to be dried when moved into the bays 20. Suitable sealing means, details of which are described hereinafter, also are provided automatically to engage the perimeter of the upper edge of the vehicles 22.

The end 24 of the plenum chamber 10 which is illustrated in FIG. 1 is provided with a suitable inlet opening 26, shown in phantom in FIG. 2, into which the delivery end of a suitable heater 28 discharges heated air for drying the crops or other products when positioned within the bays 20. The heater 28 may be of any suitable type and utilize fuel oil or the like as a source of heat. As is shown in FIG. 1, the heater 28 is mounted in elevated position by being supported upon an elevated platform 30 connected at one end to a shed structure and at the other end being supported by additional vertical posts 32, for example. If desired, the same type of heater as is illustrated in prior Patent No. 3,159,468 may be used to provide the necessary heated drying air which is to be discharged into the plenum chamber 10.

Figure 3:
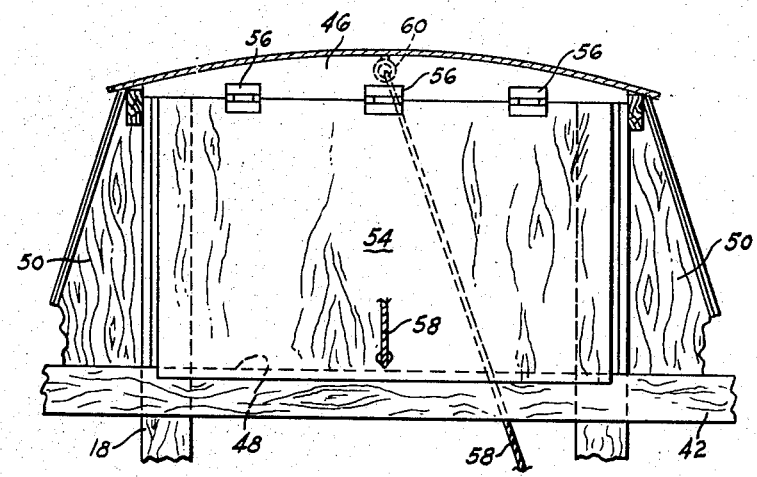
FIG. 3 is a fragmentary vertical elevation of a part of the plenum chamber in the upper portion of the crop drying shed illustrated in FIGS. 1 and 2.

Particularly referring to FIGS. 2 and 3, it will be seen that the major portion of the cross-sectional area of the plenum chamber 10 is substantially rectangular, preferably being covered by a central roof portion 34 which is only slightly curved or may be otherwise arranged to insure ready run-off of rain. Extending inward from opposite side edges of the shed are only slightly sloping outer roof sections 36, and sharply sloping intermediate roof sections 38 extend between and connect the inner edges of the roof sections 36 and the outer edges of the central roof portion 34. Such a roof arrangement is highly effective to shed rain and the like, while serving as means to define a longitudinally extending plenum chamber which is substantially rectangular in cross-section and also serves as a duct for heated air.

Referring to FIG. 5, it will be seen that one inexpensive but effective means of connecting the roof sections 36 and 38 in rain-tight manner comprises the employment of longitudinally extending flashing 40 which extends from beneath the panels of intermediate roof sections 38 and closely overlies the upper surface of outer roof sections 36.

Extending transversely between the upper ends of the outermost posts 18 are horizontal joists 42 which are substantially within the vertical planes defining the opposite sides of each of the bays 20. These joists also serve as suitable support for the ceiling 14 which is best shown in FIG. 2. Said joists also support the appropriate beveled members 44 which support the outer roof sections 36 and also comprise part of the suport for the intermediate roof sections 38, as can be seen from FIG. 2. Intermediate posts 18 within the vertical planes defining the opposite sides of the bays 20 extend upward to the central roof portion 34 and directly support transverse roof joists 46, as also can be seen from FIG. 2.

Referring to FIG. 3, it will be seen that the upper ends of the vertical posts 18, roof joists 46, and horizontal joists 42 define a substantially rectangular opening 48 which actually comprises the major portion of the complete cross-sectional area of the entire plenum chamber. Such an opening 48 is provided similarly in each of the partitions 50 which are within the vertical plane defining the opposite sides of the bays 20. Extending across each of the openings 48 in the partitions 50 defining each of the compartments 52 in the plenum chamber, which compartments are best illustrated diagrammatically in FIGS. 6 and 7, but also are shown in FIG. 1, is a closure door 54 which, as shown in full lines in FIG. 4, is disposed vertically, in closed position, while, in phantom, said door is shown in several selected partially opened positions.

The door 54 may be very simply formed from plywood of suitable shape and thickness or other suitable and preferably stiff panel means. Said doors being supported at the upper edges thereof by simple hinges 56 which are fastened to the roof joists 46. Control of the position of the doors 54 may be very easily effected by the use of simple flexible means, such as a light gage metal cable or rope 58, which at one end is connected to the lower edge of door 54 and extends through suitable guide means 60 so that the other end extends downward into the bay, as shown diagrammatically in FIG. 2, for ready engagement by an operator. Due to the fact that the movement of heated air within the plenum chamber or duct 10, as indicated by the arrows in FIG. 1, is always in a direction so as to be directed against the doors 54 when in closed position, for example, there is no need to latch said doors when in such closed position shown in full lines in FIG. 4.

Disposed centrally within the sealing structure over each bay is a heated air discharge opening 62 which preferably is of appreciable area and is arranged to conduct heated air from the plenum chamber 10 downward into the top of loaded vehicles 22 within the compartments 20. The openings 62 preferably are maintained permanently open and have no closure structure provided therefor. Instead, the closure doors 54 control the discharge of air from the plenum chamber through the selected discharge opening 62 in a manner to be described hereinafter.

The discharge openings 62 are defined preferably by rectangularly arranged planks or beams 64 which are partially shown in FIG. 4. Some of these beams extend transversely, in parallel direction with respect to the horizontal joists 42, as can be seen in FIG. 4, while others extend between the transverse beams 64, these being illustrated in exemplary manner in FIG. 1. The beams 64 are preferably uniformly spaced from the horizontal joists 42 and also are spaced inwardly from the outer side edges of the shed so as to define a substantially rectangular access opening 66, best shown in FIGS. 1 and 4. Through the openings 66 air, under pressure, is discharged from the plenum chamber 10 against the inner surface of a flexible sealing member 68, which may comprise suitable impervious sheet plastic of a flexible nature, rubberized fabric or the like.

In plan view, the access opening 66 is complementary to the upper edge of the perimeter of the vehicle 22 and, likewise, the shape and linear dimensions of the flexible sealing member 68, in plan view, are the same as those of the opening 66. The transverse width of the flexible member 68 is sufficient that it will drape downwardly, somewhat as shown in exemplary manner in FIG. 4, a sufficient distance to insure effective sealing engagement with the perimeter of the upper edge of the vehicle 22, as shown in exemplary manner in FIGS. 1 and 2. Preferably, the access opening 66 is permanently open so as always to receive air under pressure therethrough for discharge against the inner surfaces of each flexible sealing member 68 so as to distend the same into fully inflated condition.

In operation, as best illustrated, diagrammatically, in FIGS. 6 and 7, when a full complement of vehicles 22 are positioned within the bays 20, all of the closure doors 54 are opened as shown diagrammatically in FIG. 6. Under the circumstances, as clearly indicated by the directional arrows in said figure, heated, drying air will be discharged through all of the discharge openings 62 respectively into the upper ends of the vehicles 22. A minor portion of the same air, under pressure, will be discharged through the access openings 66 to inflate the flexible sealing members 68 into engagement with the perimeter of the upper ends of the vehicles 22, it being understood that adequate heated air for such purposes is continuously generated by the heater 28 and such discharge of drying air into all of the vehicles continues until drying of the products contained therein has progressed to the desired degree.

Under circumstances where less than a full complement of vehicles are to have the products therein dried, the bay nearest the heater 28 has the first vehicle 22 moved thereinto and the next bay thereto has a second vehicle moved thereinto. Assuming that these are the only two vehicles of which the products are to be dried, then, as illustrated diagrammatically in FIG. 7, the door of the opening 48 in the first partition between the first and second compartments 52 is open, while all of the other doors 54 are closed. Under such circumstances, the air under pressure will operate against the first closed door 54 and maintain the same closed, while heated air is delivered into the upper ends of the two vehicles 22, the sealing members 68 which engage the perimeters of the upper ends of said vehicles likewise being maintained in sealing position by the same air pressure.

It thus will be seen that any number of vehicles from a single one up to the maximum number of vehicles which can be accommodated by the total number of bays may be accommodated selectively by the crop drying shed comprising the present invention, as long as the bays are loaded with vehicles successively starting with the one nearest the heater 28 and successively in order from there to the farthest end of the shed.

While the invention has been described and illustrated in its several preferred embodiments, it should be understood that the invention is not to be limited to the precise details herein illustrated and described since the same may be carried out in other ways falling within the scope of the invention as claimed.

We claim:

1. A stationary drying structure for agricultural products comprising in combination, roof and ceiling structures arranged to define an elongated plenum chamber sealed at the ends and sides, support members depending from said ceiling structure and engaging the ground to support said plenum chamber at a height above the ground adequate to permit vehicles loaded with agricultural products to be moved into position beneath said ceiling for drying said products, said support members being spaced apart in the direction of the length of said plenum chamber to define bays extending transversely to said chamber and respectively receiving individual vehicles, partitions extending transversely across said plenum chamber in vertical alignment with the planes defining opposite sides of said bays and correspondingly dividing said plenum chamber into compartments respectively directly over said bays, a heater at one end of said plenum chamber operable to discharge heated drying air thereinto, each of said partitions having an opening therein, a closure door movably mounted relative to each opening to open and close the same and the ceiling portion of each compartment having a discharge opening therein to deliver drying air from said plenum chamber to a loaded vehicle in the bay therebelow, whereby loaded vehicles may be moved into said bays in succession from the one nearest the end of the plenum chamber to which the heater is attached and the doors of said partitions are opened in succession only into as many compartments as correspond to the bays containing vehicles to permit discharge of heated air into the loaded vehicles in said bays to dry the contents thereof while excluding heated air from those compartments over bays having no vehicles therein.

2. The drying structure according to claim 1 in which the discharge openings in the ceiling structure over each bay each have a flexible inflatable sealing member extending around the opening and of complementary shape in plan view to the perimeter of a vehicle to be moved into said bays, said sealing members being extendible downward when inflated into sealing contact with the perimeter of the upper edge of a vehicle when disposed therebeneath and said ceiling having access openings therethrough to permit air under pressure within said plenum chamber to engage the sealing means and inflate the same into engagement with said vehicle perimeter.

3. The drying structure according to claim 1 in which said closure doors are hingedly supported at the upper edges thereof relative to the partitions and openings of the partitions are rendered open by hingedly moving said doors upwardly toward the roof.

4. The drying structure according to claim 3 further including guide members in the upper portion of the plenum chamber and elongated flexible members connected at one end to the lower portion of each closure door and movable through said guide members, the lower ends of said flexible members extending downward into said bays for ready operation of the doors between open and closed positions.

5. The drying structure according to claim 1 in which said roof structure is shaped relative to said ceiling to define a substantially central duct-like passage extending longitudinally of said structure and substantialy rectangular in vertical cross-section and comprising the major volume of said plenum chamber, slightly downwardly and outwardly sloping outer roof sections defining the outer edges of said roof, and sharply sloping roof sections connecting said outer sections and the roof portion over said central duct-like passage, the openings in the partitions which divide said plenum chamber into compartments comprising the major portion of the cross-sectional area of said duct-like passage, whereby maximum efficiency of conveying heated air to said compartments and discharge thereof into said bays is provided.

References Cited

UNITED STATES PATENTS

| 1,018,388 | 2/1912 | Harris et al. | 34—193 X |
| 3,159,468 | 12/1964 | Hofmeister et al. | 34—233 |

FOREIGN PATENTS

| 710,063 | 5/1965 | Canada. |

FREDERICK L. MATTESON, JR., *Primary Examiner.*

A. D. HERRMANN, *Assistant Examiner.*